(12) United States Patent
Bornhardt (10) Patent No.: US 11,036,719 B2
(45) Date of Patent: *Jun. 15, 2021

(54) PERFORMANCE AND QUALITY OPTIMIZED ARCHITECTURE FOR CLOUD APPLICATIONS

(71) Applicant: SAP SE, Walldorf (DE)

(72) Inventor: Christian Bornhardt, Ettlingen (DE)

(73) Assignee: SAP SE, Walldorf (DE)

( * ) Notice: Subject to any disclaimer, the term of this patent is extended or adjusted under 35 U.S.C. 154(b) by 104 days.

This patent is subject to a terminal disclaimer.

(21) Appl. No.: 16/414,541

(22) Filed: May 16, 2019

(65) Prior Publication Data

US 2019/0272268 A1 Sep. 5, 2019

Related U.S. Application Data

(63) Continuation of application No. 13/886,461, filed on May 3, 2013, now Pat. No. 10,346,388.

(51) Int. Cl.
*G06F 17/00* (2019.01)
*G06F 16/23* (2019.01)

(52) U.S. Cl.
CPC ................ *G06F 16/2365* (2019.01)

(58) Field of Classification Search
None
See application file for complete search history.

(56) References Cited

U.S. PATENT DOCUMENTS

| | | | |
|---|---|---|---|
| 5,241,580 A | 8/1993 | Babson, III | |
| 6,880,084 B1 * | 4/2005 | Brittenham | G06F 21/77 705/66 |
| 6,915,454 B1 * | 7/2005 | Moore | G06F 11/0709 714/38.14 |
| 6,938,079 B1 * | 8/2005 | Anderson | G06F 9/44505 709/217 |
| 7,020,869 B2 | 3/2006 | Kbrari et al. | |
| 7,539,869 B1 * | 5/2009 | Mullan | G06F 21/64 380/285 |
| 7,783,613 B2 | 8/2010 | Gupta et al. | |
| 7,886,284 B2 | 2/2011 | Haven et al. | |
| 8,132,149 B2 | 3/2012 | Shenfield et al. | |
| 8,230,352 B2 | 7/2012 | Gaillard et al. | |
| 8,332,438 B2 | 12/2012 | Bantlin et al. | |
| 8,756,579 B1 * | 6/2014 | Colton | G06F 11/36 717/126 |
| 9,122,650 B1 | 9/2015 | Colton et al. | |
| 2002/0083171 A1 | 6/2002 | Hoogenboom et al. | |

(Continued)

OTHER PUBLICATIONS

SAPAG; SAPCRM7.0; 2007; 36; SAPAG; Walldorf, German; (http://www.sap.com/germany/solutions/business-suite/crm/SAP_CRM7_Highlights.pdf.

*Primary Examiner* — Hasanul Mobin
(74) *Attorney, Agent, or Firm* — Fountainhead Law Group P.C.

(57) ABSTRACT

A data validation procedure may be propagated to a server machine and to a client machine to perform the same data checking in the respective machines. The data validation procedure may be converted and expressed in a specification language that is suitable for the server machine. Likewise, the data validation procedure may be converted and expressed in a specification language that is suitable for the client machine.

20 Claims, 6 Drawing Sheets

(56) References Cited

U.S. PATENT DOCUMENTS

| | | |
|---|---|---|
| 2002/0116225 A1 | 8/2002 | Morse et al. |
| 2004/0117615 A1 | 6/2004 | O'Donnell |
| 2004/0133848 A1* | 7/2004 | Hunt .................. G06F 16/9577 715/273 |
| 2005/0005163 A1* | 1/2005 | Kirkpatrick ......... H04L 67/2819 726/4 |
| 2005/0065953 A1 | 3/2005 | Bower et al. |
| 2005/0216352 A1 | 9/2005 | Mohan et al. |
| 2006/0059169 A1 | 3/2006 | Armishev |
| 2006/0282516 A1 | 12/2006 | Taylor et al. |
| 2007/0089103 A1* | 4/2007 | Iborra ...................... G06F 8/35 717/141 |
| 2007/0203933 A1 | 8/2007 | Iversen et al. |
| 2007/0220035 A1 | 9/2007 | Misovski |
| 2008/0103555 A1* | 5/2008 | Dicks .................... G16H 40/67 607/60 |
| 2008/0270438 A1* | 10/2008 | Aronson ................ G16H 10/60 |
| 2009/0006440 A1 | 1/2009 | Tolskyakov et al. |
| 2009/0154708 A1 | 6/2009 | Kolar Sunder et al. |
| 2010/0332583 A1 | 12/2010 | Szabo |
| 2011/0055922 A1 | 3/2011 | Cohen et al. |
| 2011/0125827 A1 | 5/2011 | Ramanathan et al. |
| 2011/0153624 A1 | 6/2011 | Aigner et al. |
| 2011/0302643 A1 | 12/2011 | Pichna et al. |
| 2012/0023484 A1 | 1/2012 | Demant et al. |
| 2012/0023485 A1 | 1/2012 | Dubey et al. |
| 2012/0117041 A1* | 5/2012 | Rodriguez ............ G06F 11/362 707/702 |
| 2012/0131220 A1* | 5/2012 | Eroding .................. H04L 12/46 709/232 |
| 2013/0073525 A1 | 3/2013 | Damon et al. |
| 2014/0237603 A1* | 8/2014 | Guarnieri ............. G06F 21/577 726/25 |

* cited by examiner

```
<!DOCTYPE html>
<html> var valArray = ['ZIP' , 'NUM', '5'];   //dynamically inserted by web server function Validate()  //Generic validate function
{
    //code for processing rules in valArray
}

<body>
<h1>My First Web Page</h1>
<p id="demo">My First Paragraph.</p>

<form id="theForm" method="get" action="submitData">
<input type="text" id="ZIP" name="ZIP"/>
<input type="text" id="Country" name="country"/>
<input type="submit" value="SEND" id="submit" onclick="Validate()"> />
</form>

</body>
</html>
```

402 — `<!DOCTYPE html>` / `<html>`

404 — `var valArray = ...` / `function Validate() ...`

406 — `<body>` ... `</html>` (invocation → `onclick="Validate()"`)

PERFORMANCE AND QUALITY OPTIMIZED ARCHITECTURE FOR CLOUD APPLICATIONS

CROSS REFERENCE TO RELATED APPLICATIONS

This application is a continuation application and, pursuant to 35 U.S.C. § 120, is entitled to and claims the benefit of earlier filed application U.S. application Ser. No. 13/886,461 filed May 3, 2013, the content of which is incorporated herein by reference in its entirety for all purposes.

BACKGROUND

Unless otherwise indicated herein, the approaches described in this section are not prior art to the claims in this application, and are not admitted to be prior art by inclusion in this section.

Typically, access to enterprise data is made via business applications. Business applications may be used to allow enterprise personnel (e.g., managers, sales people, etc.) to access the enterprise data from their computing devices such as workstations, mobile devices, and the like. Business applications may be used to allow customers to access the enterprise data. For example, a customer may make an online sales order, check on pending orders, update their contact information, and so on.

Increasingly, access to the enterprise data is made over public communication networks such as the Internet. Accordingly, adequate data checking/validation is often required to ensure that valid data is provided to the enterprise to protect against inadvertent or purposeful corruption of the data.

DETAILED DESCRIPTION

Disclosed embodiments relate to methods and apparatus for data validation in a client/server architecture. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
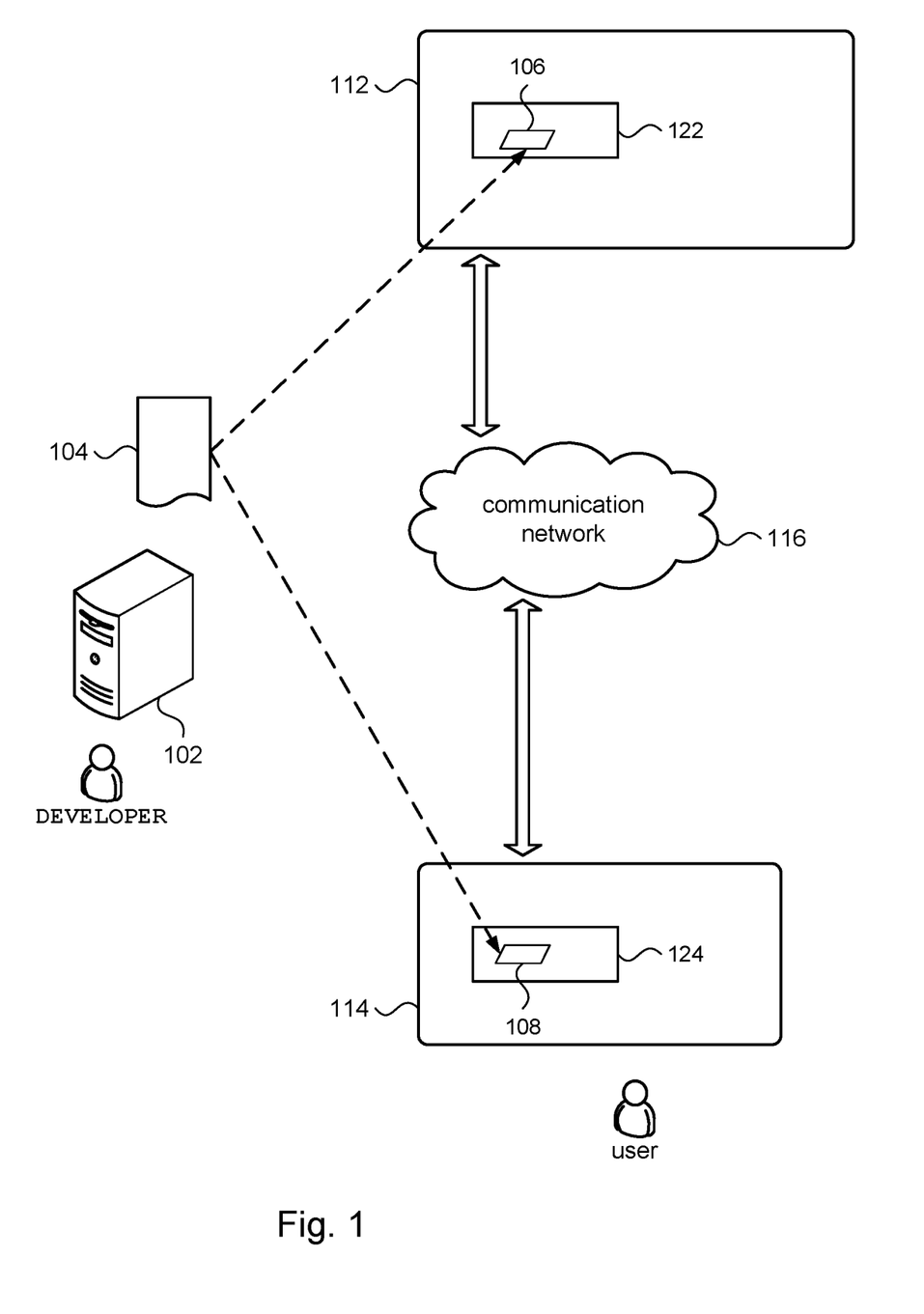
FIG. 1 illustrates a general embodiment in accordance with the present disclosure.

FIG. 1 shows a high level generalized configuration of an enterprise system in accordance with embodiments of the present disclosure, comprising a development system 102, a server system 104, and a client system 106. In some embodiments, the development system 102 may be a component in the server system 112. In other embodiments, the development system 102 may be separate from the server system 112, and in communication with the server system and/or the client system 114 over a suitable communication channel. In accordance with principles of the present disclosure, a data validation procedure 104 (e.g., developed on the development system 102 may be provided to the server system 112 and to the client system 114 using various mechanisms, which will be described below.

In particular embodiments, the server system 112, for example, may be an enterprise server hosting one or more backend business applications 122 of the enterprise. The client system 114 may be a computing device executing a frontend application 124 for accessing one of the business applications 122. In embodiments, the client system 114 may be a personal computer (e.g., desktop or laptop computer, etc.), a mobile computing device (e.g., mobile phone, computer tablet, etc.), and so on. The frontend application 124 may use any suitable communication protocol whether public (e.g., the Hypertext Transport Protocol, HTTP) or a proprietary protocol to communicate with the business application 122 over a suitable communication network 116 such as the Internet, a local area network, a wide area network, and so on.

In accordance with principles of the present disclosure, the first data validation procedure 104 may be developed on development system 102 and used to specify data validation processing for the business application 122 and for the frontend application 124. A developer, may develop or otherwise provide the first data validation procedure 104 on development system 102.

In some embodiments, the first data validation procedure 104 may be expressed in a first specification language. For example, the first specification language may be rules based. Table 1 below shows an illustrative example for validating data relating to an address (e.g., zip code, a country name) using rules. The example shows a matrix based rule that expresses data formatting rules for the zip code and the country name:

TABLE 1 zip; NUM; 5; ;
country; ALPHA; ;50
END TABLE 1

The rules in Table 1 specify that the zip code (identified by the field name "zip") is numeric data ("NUM") and exactly 5 digits long, and that the country name (identified by the field name "country") is an alpha string ("ALPHA") that can be up to 50 characters long.

In other embodiments, the first specification language may be a scripting language. Table 2 below, shows an illustrative example of scripting language:

TABLE 2

If 'Country'='DE'
    CheckLen('ZIP', 5, "Zip code length must be 5")
Else
    CheckMaxLen('ZIP', 7, "Max zip code length is 7")
End if
CheckType('ZIP ', 'NUM')
CheckDate('POSTDATE' <= 'TODAY')
END TABLE 2

In still other embodiments, more generally, the first specification language may be any suitable language for specifying a data validation procedure.

In accordance with the present disclosure, as illustrated in FIG. 1, the first data validation procedure 104 may be converted to produce a second data validation procedure 106 that is expressed in a second specification language. In some embodiments, the second specification language is different from the first specification language. For example, while the first data validation procedure 104 may be written in a rule based or scripting language, the second data validation procedure 106 may be expressed in a programming language that is suitable for the server. Examples of suitable server-side programming language/models include Java, C++, Personal Home Page scripting language (PHP), Advanced Business Application Programming language (ABAP), and so on. In some embodiments, the second data validation procedure 106 may be incorporated into the business application 122; for example, as a subroutine within the business application. In other embodiments, the second data validation procedure 106 may be a shared library module separate from the business application 122, and accessed by the business application at runtime, for example, using a dynamic linking mechanism.

Further in accordance with the present disclosure, the first data validation procedure 104 may be converted to produce a third data validation procedure 108 that is expressed in a third specification language. In some embodiments, the third specification language is different from the first specification language. The third data validation procedure 108 may be incorporated with the frontend application 124 in a similar manner as the second data validation procedure 106 is incorporated with the business application 122. The third specification language, for example, may be JavaScript code, HTML/CSS, etc.

In accordance with the present disclosure, the developer may test and otherwise assess their data validation design by running a test suite (e.g., using test automation) on the first data validation procedure 104. Since the second and third data validation procedures 106, 108 derive from the first data validation procedure 104, the test suite need only be run once.

As indicated in FIG. 1, the first data validation procedure 104 may be provided directly to the client system 114. This configuration may be suitable for embodiments where the frontend application 124 is a user interface (UI) that is customized for accessing the business application 122. In other embodiments, the frontend application 124 may be a web-based application (e.g., web browser), and the business application 122 may include a web interface that can provide access to the business application via the web browser. This is shown in FIG. 2.

Figure 2:
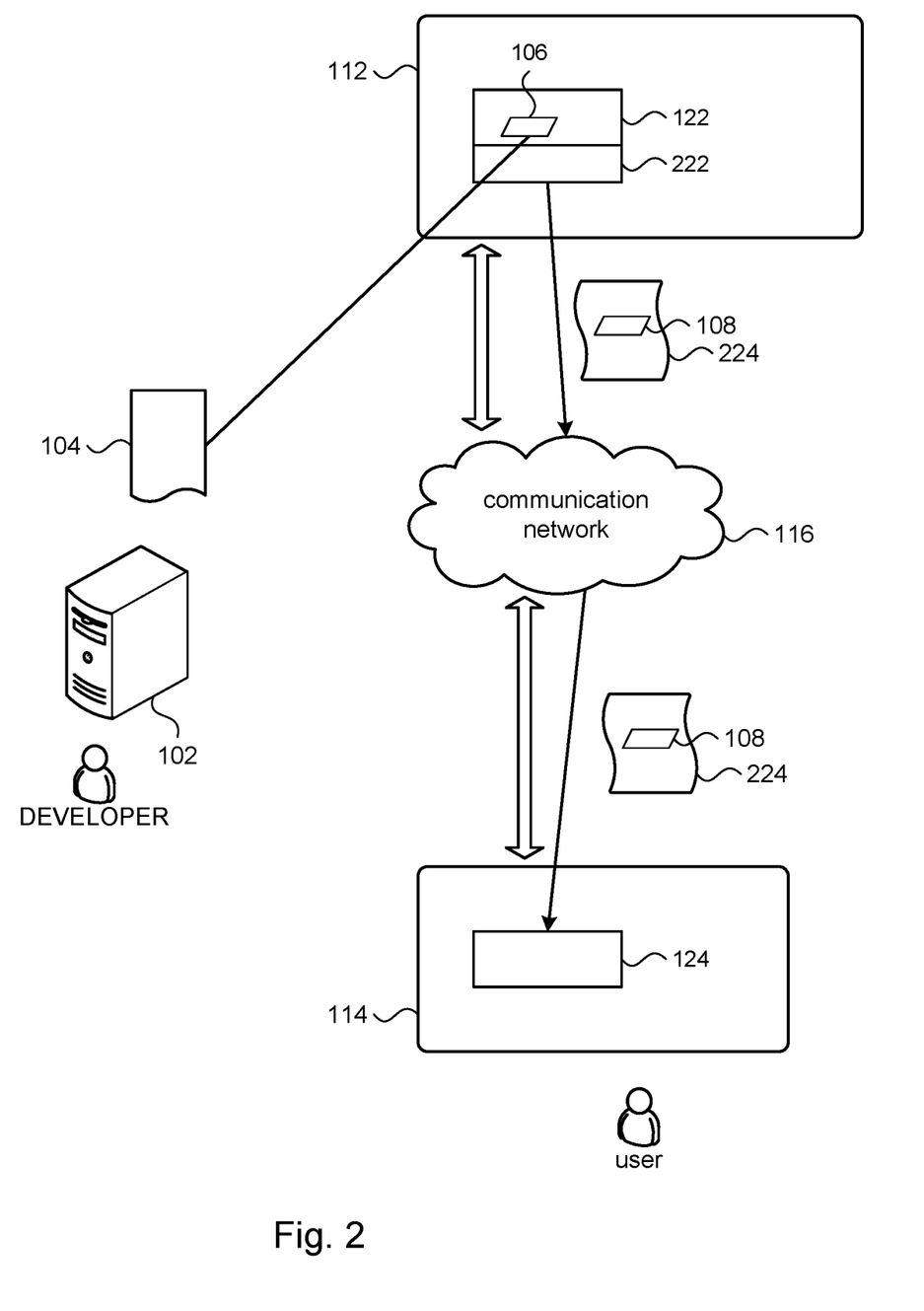
FIG. 2 illustrates an example of a web-based embodiment in accordance with the present disclosure.

FIG. 2 illustrates a configuration in which the frontend application 124 is a web-based UI. In some embodiments, for example, the frontend application 124 may be a conventional web browser such as the Microsoft® Internet Explorer® web browser, the Mozilla® Firefox® web browser, etc. The business application 122 may include a web interface 222 that the web browser frontend 124 can communicate with. In particular, the web interface 222 may send a web page 224 to the web browser fronted 124 that includes the third data validation procedure 108 expressed in a suitable specification language such as JavaScript code, HTML/CSS, and the like. In other embodiments, more generally, the frontend application 124 may be any suitable web-based application. The web interface 222 may provide the third data validation procedure 108 as a web service; e.g., based on a Representational State Transfer (REST) architecture, based on Web Services Description Language (WSDL), and the like.

Figure 3:
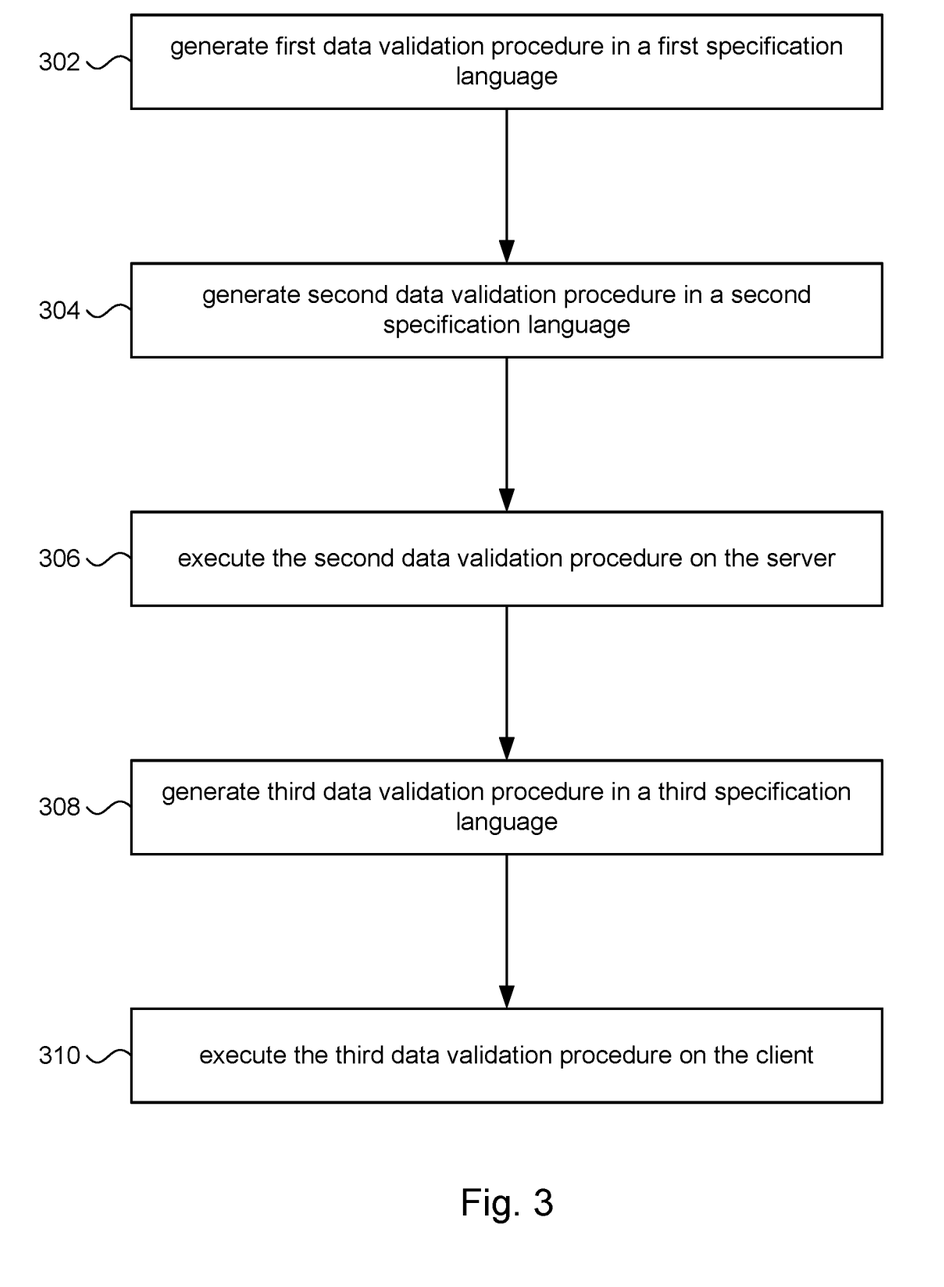
FIG. 3 illustrates processing in accordance with the present disclosure.

FIG. 3 illustrates high level handling of the first data validation procedure 104 in accordance with principles of the present disclosure. In a block 302, the first data validation procedure 104 may be developed using a first specification language. As explained above, for example, a developer on development system 102 may develop the data validation procedure 104 using a scripting language or a rules based language. The language may be a commercially available product, or may be a proprietary system. The data validation procedure 104 may perform data checking, data verification, data cross-checking, and any other kind of validation that may be needed for the particular business application (e.g., business application 122) for which the data is being validated.

In a block 304, the development system 102 may generate a second data validation procedure 106 from the first data validation procedure 104. In some embodiments, the development system 102 may provide the first data validation procedure 104 to the server system 112, where the server system generates the second data validation procedure 106. In other embodiments, the development system 102 may generate the second data validation procedure 106 and then provide the second data validation procedure to the server system 112.

In accordance with the present disclosure, the second data validation procedure 106 may be expressed in a specification language different from the specification language that is used to express the first data validation procedure 104. In some embodiments, for example, block 304 may include translating the specification language of the first data validation procedure 104 into the server-side programming language that was used to build the business application 122. As an example, if the business application 122 is written in the C++ programming language, then the second data validation procedure 106 may be expressed in C++ and compiled along with the business application 122. Data validation processing in the business application 122 may then be conducted as defined in the first data validation procedure 104.

In a block 306, the server system 112 may execute the second data validation procedure 106. In some embodiments, for example, if the second data validation procedure 106 is expressed in a procedural language (e.g., C++), then the second data validation procedure may be compiled into the binary code comprising the business application 122. The resulting executable code may then be executed on the server system 112. In other embodiments, for example, the compiled procedure may configured as a shared library module that can be dynamically linked by the business application 122.

In a block 308, a third data validation procedure 108 may be generated from the first data validation procedure 104. The third data validation procedure 108 may be expressed in yet a third specification language that is different from the first specification language. For example, if the frontend application 124 is a Java-based application, the third specification language may be JavaScript code or HTML/CSS, and the like.

In some embodiments, the third data validation procedure 108 may be generated by the server system 112 and pushed to the client system 114. In other embodiments, the development system 102 may generate both the second and third data validation procedures 106, 108 and provide them to the server system 112. The server system 112 may then push the third data validation procedure 108 to the client system 114, where it can then be executed by the frontend application 124 (e.g., web browser) in a block 310.

Figure 4:
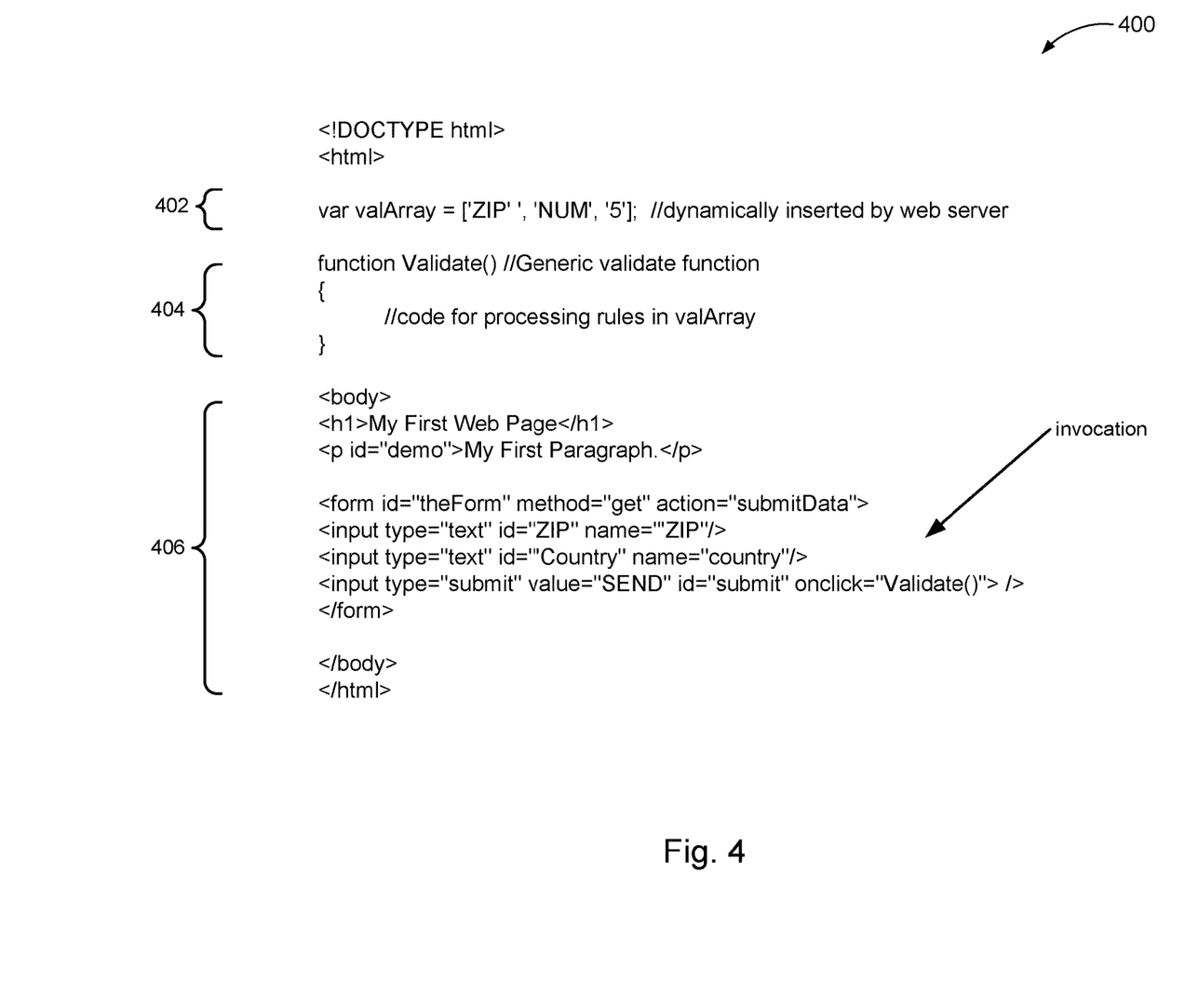
FIGS. 4 and 5 show simplified examples of HTML code according to embodiments of the present disclosure.
Figure 5:
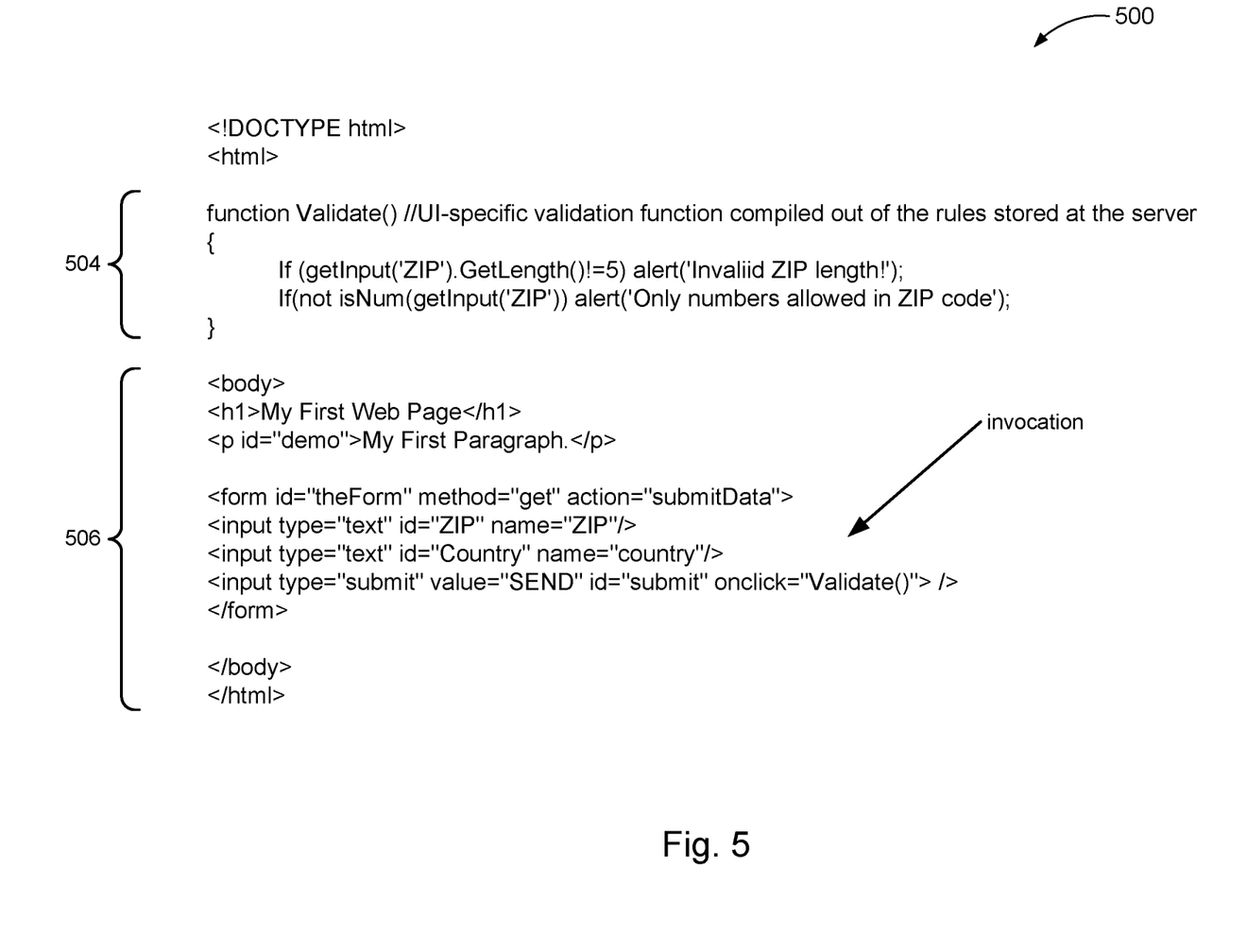

Referring now to FIGS. 4 and 5, web-based examples of data validation processing will be explained. Suppose the first data validation procedure 104 comprises the following rule for data checking:

TABLE 3 zip; NUM; 5; ;
END TABLE 3

As explained above, where the frontend application 124 is a web-based application (e.g., a web browser), the server system 112 may convert the first data validation procedure 104 to produce the third data validation procedure 108, which can then be pushed to the client system 114.

FIG. 4 shows an example of how the data validation procedure 104 may be expressed as HTML code. The figure illustrates HTML code 400, which the frontend web browser application 124 can use to render a web page for receiving input data from a user. The HTML code 400 includes a section 402 that expresses the data validation procedure 104 shown in Table 3 as data in an array called valArray[ ]. A section 404 defines an interpreter function called Validate( ), which comprises code (not shown) that can interpret or otherwise execute the rules specified in valArray[ ]. A section 406 represents the body of the HTML code. The body invokes the Validate( ) function when a mouse click event is detected in order to validate the input data.

The approach illustrated in FIG. 4 uses an interpreter, namely Validate( ), to process an array (e.g., valArray[ ]) that contains the rules set forth in the first data validation procedure 104. The array valArray[ ] may be initialized by the server system 112 with coding from the first data validation procedure 104. Data validation is performed when the client system 114 invokes the interpreter function Validate( ) to run through the contents of the array valArray[ ].

In other embodiments, the data validation procedure 104 may be expressed as a customized validation function in the HTML code. Referring to FIG. 5, HTML code 500 comprises a validation function 504, which defines the validation function Validate( ), and a body section 506 having code that invokes the validation function. The validation function Validate( ) contains code generated in the server system 112 that is specific to the procedure set forth in the data validation procedure 104.

The examples illustrated in FIGS. 4 and 5 validate data when the data is submitted; e.g., by clinking an OK button. In other embodiments, data validation may be performed when the user leaves a data input field; e.g., by hitting the TAB key to go to the next data input field.

Figure 6:
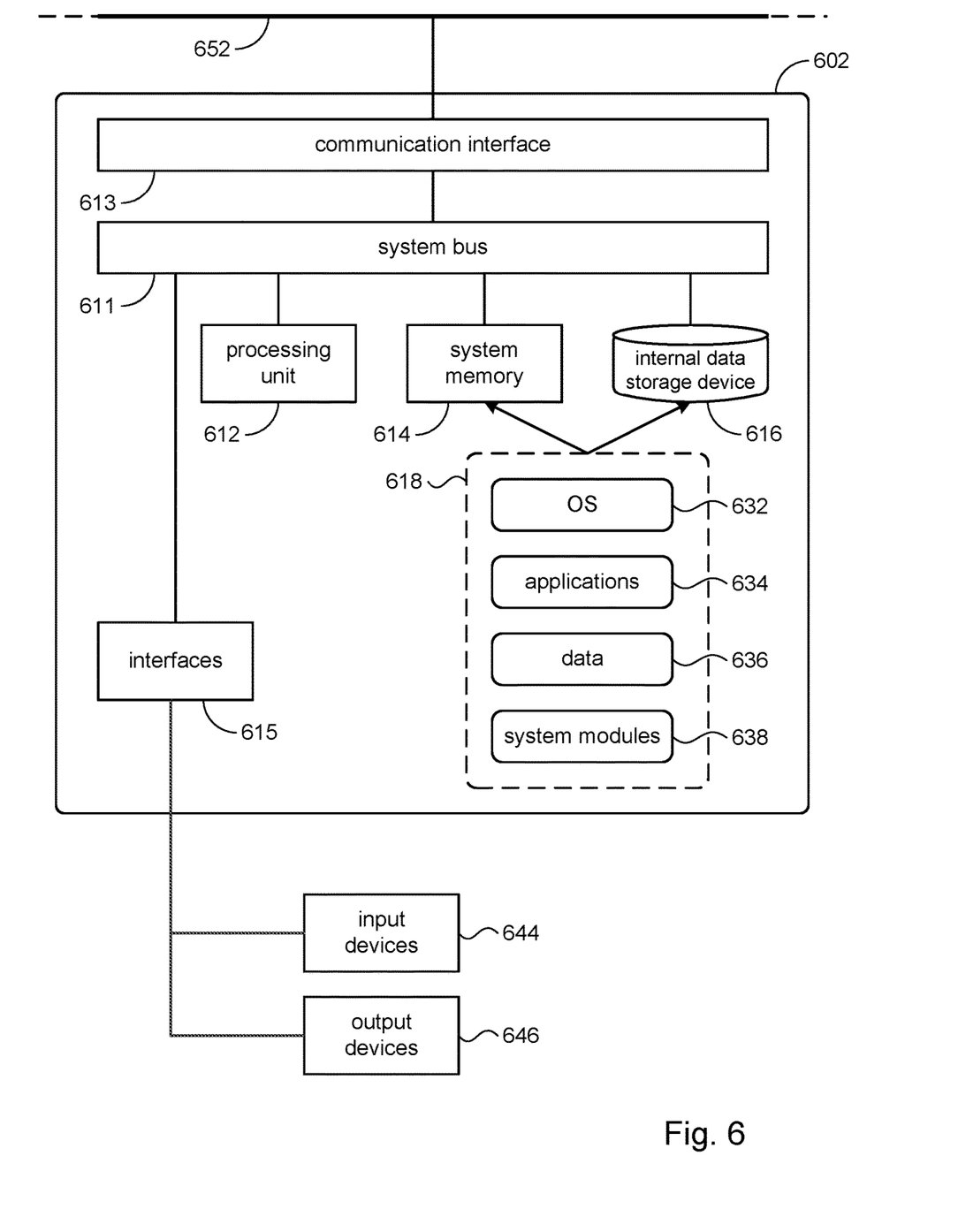
FIG. 6 illustrate a computer system that may be used in embodiments of the present disclosure.

FIG. 6 shows an illustrative embodiment that may be used to implement any or each of the development system 102, the server system 112, and the client system 104. The embodiment may include a computing component 602 having a processing unit 612, a system memory 614, and a system bus 611. The system bus 611 may connect various system components including, but not limited to, the processing unit 612, the system memory 614, an internal data storage device 616, and a communication interface 613. In the case of a client system 114, the embodiment may be a mobile computing device.

The processing unit 612 may comprise a single-processor configuration, or may be a multi-processor architecture. The system memory 614 may include read-only memory (ROM) and random access memory (RAM). The internal data storage device 616 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computing component 602 is a mobile device, the internal data storage 616 may be a flash drive.

The internal data storage device 616 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 614 and/or the internal data storage device 616 may store a number of program modules, including an operating system 632, one or more application programs 634, program data 636, and other program/system modules 638. For example, where FIG. 6 represents an implementation of development system 102, the application programs 634 may constitute a development system to develop data validation procedure 104. Where FIG. 6 represents an implementation of server system 112, the application programs 634, which when executed by computing component 602, may cause the server system to perform steps shown in FIG. 3; likewise, when FIG. 6 represents an implementation of client system 114.

Access to the computing component 602 may be provided by a suitable input device 644 (e.g., physical or virtual keyboard, mouse, touch pad, etc.) and a suitable output device 646, (e.g., display screen). In a configuration where the computing component 602 is a mobile device, input and output may be provided by a touch sensitive display.

The computer system 602 may operate in a networked environment using logical connections via wired and/or wireless communications to one or more remote computers (not shown) over a communication network 652. The communication network 652 may be the Internet, a local area network (LAN) and/or larger networks, such as a wide area network (WAN).

Advantages and Technical Effect

Advantages an technical effects of embodiments according to the present disclosure will now be discussed. Typically, data validation should be conducted at the backend (e.g., server system 112) because client data cannot be considered trusted; e.g., due to a compromised frontend (e.g., hacked browser), man-in-the-middle attacks, and the like. However, the conventional approach of providing data validation only at the backend can lead to degraded performance since each time a data validation action is triggered, a round-trip communication from the frontend (e.g., client system 114) to the backend and a return trip to the frontend is required, which can significantly degrade performance.

A conventional solution includes performing some data checking on the frontend. However, as explained above, data validation still must be conducted on the backend because of possibly compromised frontend. In addition, certain data validation checks may be possible on the frontend because the program language used by web browsers (e.g., JavaScript, HTML/CSS, etc.) may limit what kind of data validation processing can be performed.

Typically, the developer develops and maintains two data validation programs, one set of procedures developed for the backend software (e.g., the business logic) and another set of procedures developed for the frontend (e.g., browser web pages). This can result in high development costs because the backend software is typically implemented in a language (e.g., ABAP, C++, Java, etc.) that is different from the frontend code (e.g., JavaScript code), and possibly by different development teams. Developing and managing separate data validation procedures can result in inconsistent treatment of data; e.g., data that is deemed valid by the frontend may be deemed invalid by the backend and vice versa. Over time, the frontend data validation procedure and the backend validation procedure may get out of sync in terms of what is deemed valid, what data is checked, and so on.

In accordance with principles of the present disclosure, the data validation procedure that is performed in the server system 112 and the data validation procedure that is performed in the client system 114 are obtained from a single source, namely the data validation procedure 104. As can be appreciated, embodiments according to principles of the present disclosure avoid round-trip processing by providing for data validation to be made in the frontend. Having a common source of the data validation procedures prevents deviation of the procedures that are performed in the frontend and the backend. Also, a common source of data validation procedures results in lower maintenance costs by virtue of a single development and support effort. In addition, automated test suites need only be developed for the source data validation procedure 104. In addition, further checks can be performed on the backend, which cannot be done on the frontend.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed:

1. A method for validating data comprising:
   exchanging, by a server system, data with a client system;
   receiving, by the server system, a first data validation procedure expressed in a first specification language;
   executing, by the server system, the first data validation procedure to perform a validation of data exchanged between the server system and the client system in accordance with the first data validation procedure; and
   providing, by the server system, the first data validation procedure to the client system, including sending an interpreter engine and a representation of the first data validation procedure to the client system,
   wherein the client system performs a validation of data exchanged between the server system and the client system in accordance with the first data validation procedure using the interpreter engine to interpret the first data validation procedure.

2. The method of claim 1, further comprising sending an interpreter engine and a representation of the first data validation procedure to the client system in a web page.

3. The method of claim 1, wherein sending an interpreter engine and a representation of the first data validation procedure to the client system includes:
   converting the first data validation procedure to a data validation procedure expressed in a third specification language different from the first specification language; and
   sending the third data validation procedure to the client system,
   wherein the client system executed the third data validation procedure to perform validation of data exchanged between the server system and the client system.

4. The method of claim 3, further comprising sending the third data validation procedure to the client system in a web page.

5. The method of claim 4, wherein the third data validation procedure is computer executable program code.

6. The method of claim 1, further comprising the server system converting the first data validation procedure that is expressed in the first specification language to a second data validation procedure expressed in a second specification language different from the first specification language and executing the second data validation procedure to perform a validation of data exchanged between the server system and the client system in accordance with the first data validation procedure.

7. The method of claim 6, wherein the second specification language is either an interpreted language or a compiled language.

8. A server system comprising:
   a data processing unit; and
   a memory having stored therein executable program code, which when executed by the data processing unit, causes the data processing unit to:
      exchange data with a client system that is separate from the server system;
      receive a first data validation procedure expressed in a first specification language;
      execute the first data validation procedure to perform a validation of data exchanged between the server system and the client system in accordance with the first data validation procedure; and
      provide the first data validation procedure that is expressed in the first specification language to the client system, including sending an interpreter engine and a representation of the first data validation procedure to the client system,
   wherein the client system performs a validation of data exchanged between the server system and the client system in accordance with the first data validation procedure using the interpreter engine to interpret the first data validation procedure.

9. The server system of claim 8, wherein the executable program code, which when executed by the data processing unit, further causes the data processing unit to send an interpreter engine and a representation of the first data validation procedure to the client system in a web page.

10. The server system of claim 8, wherein the executable program code, which when executed by the data processing unit, further causes the data processing unit to:
    convert the first data validation procedure to a data validation procedure expressed in a third specification language different from the first specification language; and
    send the third data validation procedure to the client system, wherein the client system can execute the third data validation procedure to perform validation of data exchanged between the server system and the client system.

11. The server system of claim 10, wherein the third data validation procedure is sent to the client system in a web page.

12. The server system of claim 11, wherein the third data validation procedure is computer executable program code.

13. The server system of claim 8, wherein the executable program code, which when executed by the data processing unit, further causes the data processing unit to:
   convert the first data validation procedure that is expressed in the first specification language to a second data validation procedure expressed in a second specification language different from the first specification language; and
   execute the second data validation procedure to perform a validation of data exchanged between the server system and the client system in accordance with the first data validation procedure.

14. The server system of claim 13 wherein the second specification language is either an interpreted language or a compiled language.

15. A method for validating data in a client system, the method comprising:
   the client system exchanging data with a server system, wherein the server system performs a validation of data exchanged between the server system and the client system in accordance with a first data validation procedure that is expressed in a first specification language;
   the client system receiving the first data validation procedure from the server system; and
   the client system executing the first data validation procedure to perform a validation of data exchanged between the server system and the client system in accordance with the first data validation procedure, including receiving from the server system an interpreter engine, wherein the client system executes the interpreter engine to interpret the first data validation procedure.

16. The method of claim 15, further comprising the client system receiving the interpreter engine and the first data validation procedure in a web page.

17. The method of claim 15, wherein the first data validation procedure is expressed in the first specification language.

18. The method of claim 15, wherein the first data validation procedure is expressed in a third specification language different from the first specification language, wherein the client system executes the third data validation procedure to perform the validation of data exchanged between the server system and the client system.

19. The method of claim 18, further comprising the client system receiving the first data validation procedure expressed in the third specification language in a web page.

20. The method of claim 18, wherein the first data validation procedure expressed in the third specification language is generated by the server system.

* * * * *